(12) United States Patent
Gillet

(10) Patent No.: US 10,737,431 B2
(45) Date of Patent: Aug. 11, 2020

(54) INJECTION DEVICE COMPRISING AT LEAST ONE FLEXIBLE DIAPHRAGM

(71) Applicant: DISCMA AG, Hunenberg (CH)

(72) Inventor: Denis Gillet, Octeville sur Mer (FR)

(73) Assignee: Discma AG

( * ) Notice: Subject to any disclaimer, the term of this patent is extended or adjusted under 35 U.S.C. 154(b) by 547 days.

(21) Appl. No.: 15/121,614

(22) PCT Filed: Feb. 13, 2015

(86) PCT No.: PCT/EP2015/053129
§ 371 (c)(1),
(2) Date: Aug. 25, 2016

(87) PCT Pub. No.: WO2015/128211
PCT Pub. Date: Sep. 3, 2015

(65) Prior Publication Data
US 2016/0361859 A1    Dec. 15, 2016

(30) Foreign Application Priority Data

Feb. 26, 2014   (EP) ..................................... 14305274

(51) Int. Cl.
*B29C 49/58*   (2006.01)
*B29C 49/46*   (2006.01)
(Continued)

(52) U.S. Cl.
CPC .............. *B29C 49/58* (2013.01); *B29C 49/46* (2013.01); *B29C 49/06* (2013.01);
(Continued)

(58) Field of Classification Search
CPC . B29C 49/06; B29C 49/46; B29C 2049/4664; B29C 49/58; B29C 2049/5806; B29C 2049/5831
(Continued)

(56) References Cited

U.S. PATENT DOCUMENTS 4,671,762 A   6/1987 Weiler
5,127,431 A   7/1992 Credle
(Continued)

FOREIGN PATENT DOCUMENTS

WO   2008/078174   7/2008

*Primary Examiner* — Kirsten Jolley
(74) *Attorney, Agent, or Firm* — Eric J. Sosenko; Jonathan P. O'Brien; Honigman LLP

(57) ABSTRACT

An injection device having at least one flexible diaphragm. The injection device for forming a preform into a container and filling the container, and further including a main housing having an inlet, an outlet and an injection chamber, a closing body movable relative to the outlet between a closed position and an opened position, a closing diaphragm attached at least to the closing body, the injection chamber being delimited at least by an inner surface of the closing diaphragm, the closing diaphragm having an outer surface defining an outside area, a bearing surface against which a supported portion of the outer surface of the closing diaphragm is applied. The closing diaphragm further includes a free portion forming with the supported portion the whole outer surface of the closing diaphragm. The bearing surface is arranged such that the surface of the free portion decreases when the closing body moves from the closed position to the opened position.

19 Claims, 7 Drawing Sheets

(51) Int. Cl.
  *B29L 31/00*  (2006.01)
  *B29C 49/06*  (2006.01)
  *B29K 67/00*  (2006.01)

(52) U.S. Cl.
  CPC .......... *B29C 2049/4664* (2013.01); *B29C 2049/5831* (2013.01); *B29K 2067/003* (2013.01); *B29L 2031/7158* (2013.01)

(58) Field of Classification Search
  USPC ........................................... 264/523
  See application file for complete search history.

(56) References Cited

U.S. PATENT DOCUMENTS

| | | |
|---|---|---|
| 7,697,562 B2 | 4/2010 | Lee et al. |
| 8,684,723 B2 | 4/2014 | Lisch et al. |
| 9,096,011 B2 | 8/2015 | Elbs |
| 2012/0201918 A1* | 8/2012 | Elbs .................. B29C 49/783 425/149 |

* cited by examiner

INJECTION DEVICE COMPRISING AT LEAST ONE FLEXIBLE DIAPHRAGM

CROSS-REFERENCE TO RELATED APPLICATIONS

This application is the U.S. national phase of PCT Application No. PCT/EP2015/053129 filed on Feb. 13, 2015 and claims priority to European Application No. 14305274.4 filed on Feb. 26, 2014, the disclosures of which are incorporated in their entirety by reference herein.

TECHNICAL FIELD

The invention relates to an injection device for a forming and filling station for forming a container from a preform and filling said container using a pressurized liquid and filling said container.

The invention also relates to a forming and filling station comprising such an injection device and an injection method using such an injection device and to a forming and filling method for forming a container from a preform using such an injection method.

The invention relates to the field, known as hydro forming, of forming containers from a preform using an incompressible liquid to deform the preform.

In the application, "liquid" has a physical meaning. It designates any incompressible and able to flow medium. The liquid can have a low viscosity (like water or alcohol), a medium viscosity (like eatable oil or soup), or a high viscosity (like yoghurt or creamy product). The liquid can be homogeneous or not homogeneous (including fruit pulp or bits of foodstuff). It is not limited to foodstuff. The incompressible liquid may be for example water, or other beverages, body care products, home and garden care products, medical fluids, fuels, operating fluids, and the like.

BACKGROUND

In the field of hydro forming, it is known to inject the incompressible liquid in a heated preform made of plastic material at a pressure which is adapted to urge the wall of the preform against the wall of the molding cavity such that the preform is deformed and acquires the shape of the molding cavity and of the container to be produced.

However, it is also known that this pressure level is not sufficient to completely shape the preform into the container, meaning that, with the pressure applied to the preform, the preform acquires a shape which is not exactly the shape of the molding cavity and that an extra deformation is needed to completely urge the wall of the preform against the wall of the molding cavity. It is in particular the case when embossed letters or logos must be reproduced on the external surface of the container wall, or when the wall has ridges. Shapes having locally a very small radius of curvature are very difficult to obtain.

To this end, after the injection of liquid at a first pressure, a second pressure greater than the first pressure, is applied to the preform during a short time in order to create a pressure peak inside the preform, the pressure peak being arranged to finalize the shaping of the preform into a the container.

The liquid is injected through the outlet of an injection device placed in fluidic communication with the preform and comprising at least a closing body movable between a closed position and an opened position controlling the injection of liquid inside the preform. A liquid tightness has to be established between the moving closing element and the fixed part of the injection device in order to avoid any leaking of the injected liquid, in particular to prevent liquid from flowing towards the actuation means controlling the movement of the closing body. Such a fluid tightness is achieved using sealing means arranged between the closing body and the fixed part of the injection device.

However, such sealing means have to be able to sustain the pressure of the liquid, in particular when the second pressure is applied to the preform, together with millions of cycles.

EP-1 762 539 discloses a filling device for injecting a liquid into an already formed container. In such a filling device, the liquid is injected at the atmospheric pressure since the container is not deformed by the liquid during the injection. Furthermore, in such a filling device, the outlet of the injection device is spaced from the inner volume of the container, meaning that the injection device is not in a fluid tight fluidic communication with the container during the liquid injection. Consequently, the sealing means provided in such a filling device does not have to sustain a high pressure during the injection. In EP-1 762 539, the sealing means are formed by a disc-shaped membrane arranged between a fixed part and a movable part, said membrane stretching and adopting a conical shape when the movable part moves to an opened position. Such a shape is not adapted to sustain a high liquid pressure and such sealing means would be rapidly deteriorated if they were to be used in an injection device arranged to form and fill a container from a preform.

WO-2008/078174 and U.S. Pat. No. 5,127,431 disclose sealing means arranged between a fixed part and a movable part and receiving liquid at a certain pressure. However, in these documents, the pressure applied on one side of the sealing means is compensated by the pressure of a fluid present on the other side of the sealing means. Such an arrangement is not satisfactory since it requires a control fluid to compensate the pressure of the injected liquid, which greatly complicates the structure of the injection device and the functioning thereof.

One of the aims of the invention is to overcome these drawbacks by proposing an injection device able to inject a liquid at a high pressure without damaging the sealing means and without requiring a compensating fluid to resist to the high pressure.

SUMMARY OF THE INVENTION

To this end, the invention relates to an injection device comprising:
  a main housing comprising an inlet intended to be placed in fluidic communication with a pressurized liquid source, an outlet intended to be placed in fluidic communication with the preform and an injection chamber arranged to receive and contain the pressurized liquid between the inlet and the outlet,
  a closing body, movable relative to the outlet between a closed position and an opened position,
  a closing diaphragm attached at least to the closing body, the injection chamber being delimited at least by an inner surface of said closing diaphragm, said closing diaphragm having an outer surface extending outside the injection chamber and defining an outside area isolated from the injection chamber in a fluid tight manner,
  a bearing surface against which a supported portion of the outer surface of the closing diaphragm is applied, the bearing surface being defined by at least a part of the main housing and/or by at least a part of the closing body, the closing diaphragm further comprising a free portion forming with the supported portion the whole outer surface of the closing diaphragm, wherein the bearing surface is arranged such that the surface of the free portion decreases when the closing body moves from the closed position to the opened position.

The bearing surface is used to support the closing diaphragm during the injection of the liquid. Consequently, when the closing body is in the opened position and a liquid is injected and flows on the inner surface of the closing diaphragm, the closing diaphragm is able to sustain the pressure of the liquid by resting on the bearing surface since the free portion of the outer surface of the closing diaphragm, which is not supported, is greatly reduced. The closing diaphragm is therefore able to resist to a high pressure applied on its inner surface without requiring the use of a compensating fluid on its outer surface.

Advantageously, the outside area may be a dry area and/or may be connected to the atmosphere.

As mentioned above, in EP-1 762 539, the disc-shaped membrane adopts a conical shape in the opened position, which means that the membrane is stretched inside the main housing and remains unsupported in the opened position when liquid is injected, the surface of the free portion remaining the same when the movable part moves from the closed position to the opened position, which makes such a disc-shaped membrane unfit to be used when liquid is injected at a high pressure.

According to other features of the injection device according to the invention:

the injection device comprises a plurality of cavity bodies including at least one pair of two cavity bodies movable with respect to each other, wherein the two cavity bodies of said or each pair of cavity bodies are associated to each other by at least one flexible diaphragm maintaining a liquid tightness between said two cavity bodies, all along the relative movement between said two cavity bodies, and wherein the injection chamber is totally delimited between the inlet and the outlet by a rigid surface of each cavity bodies and by each of the at least one flexible diaphragm associating said or each pair of cavity bodies;

one of the cavity bodies is the closing body, the main housing including at least one other cavity body and one of said at least one flexible diaphragm is the closing diaphragm, the injection device having an active configuration wherein simultaneously the closing body is in the open position with respect to the outlet and the main housing is arranged such that the outlet is placed in a fluidic communication with the preform.

The injection chamber is delimited by the rigid cavity bodies and by the sealing elements, at least one of them being the flexible closing diaphragm. This embodiment of the invention is different from a known arrangement including for example a simple rolling diaphragm rolling between two parallel support bodies. In such a known arrangement, a supported portion of the rolling diaphragm is distributed between the two cylindrical support bodies. The surface of the supported portion is equal to the sum of the surface of the supported portion of the rolling diaphragm applied against one of the support body and of the surface of the supported portion applied against the other support body. The rolling diaphragm has a free portion extending between the two support bodies.

When the rolling diaphragm rolls due to the relative movement between the support bodies, the bearing surface against which the rolling diaphragm is applied, extends less along one of supporting bodies and more along the other supporting body, but the surface of the free portion stays substantially constant. In the invention, the bearing surface against which the flexible diaphragm is applied may extend along only one rigid support body or may be distributed between several rigid support bodies. However, at least the rigid support body, against which the largest part of the flexible diaphragm is applied during the movement of the closing body from the closed position to the opened position, has the particular and unique function of being arranged such that the surface of the free portion decreases during this movement such that the mechanical support of the closing diaphragm is increased in the opened position relative to the closed position.

According to another feature of the injection device according to the invention, each of or at least one of the flexible diaphragms is a supported diaphragm having one end attached to one of the associated cavity bodies and another end attached to the other associated cavity bodies, and wherein said supported diaphragm is further associated with at least one rigid support body extending outside of the injection chamber and against which a supported portion of an outer surface of the flexible diaphragm is applied, the rigid support body being attached to or forming an outside portion of one of the associated cavity bodies.

According to another feature of the injection device according to the invention, at least one rigid support body associated with said supported diaphragm is a receiving body defined by the fact that the relative movement between the cavity bodies associated with the supported diaphragm towards the active configuration of the injection device increases the surface of the supported portion of the supported diaphragm applied against said receiving body, wherein said receiving body comprises a curved portion against which the free portion of said supported diaphragm is progressively applied during said relative movement.

One possible way of providing a rigid support body with a curved shape having the above function, but the invention is not limited to that way, is to design a rigid support body having a curved shaped bearing surface substantially complementary to the natural shape adopted by the flexible closing diaphragm, when said diaphragm is pushed by liquid under a low pressure in the injection chamber while the closing body is in the opened position. Therefore, when the pressure inside the injection chamber increases to a high pressure, there is no further deformation of the flexible diaphragm because said diaphragm is already applied against the rigid support body having the proper adapted curved shaped bearing surface.

According to other features of the injection device according to the invention:

the injection device further comprises a preform seat arranged for receiving the preform, and a nozzle actuator arranged to move the outlet with respect to the preform seat between an active position, wherein the outlet is placed in fluidic communication with the preform and a retracted position allowing introducing a preform in the preform seat;

wherein one of the cavity bodies is a main body comprising the inlet of the injection device and another cavity body is a nozzle body comprising the outlet, the nozzle actuator being arranged to move the nozzle body relative to the main body between the active position and the retracted position;

the closing diaphragm has a first end attached to the closing body and a second end attached to the main body;

the nozzle actuator includes a first actuation chamber provided in the housing, and a nozzle piston member sliding in the first actuation chamber;

the injection device comprises a flexible nozzle diaphragm in addition to the flexible closing diaphragm, the flexible nozzle diaphragm having a first end attached to the nozzle body and a second end attached to the main body in order to provide a sealing continuity between the nozzle body and the main body all along the relative movement between the nozzle body and the main body.

Advantageously, the injection chamber is totally delimited by the three cavity bodies which are the main body, the nozzle body and the closing body, by the closing flexible diaphragm providing sealing continuity between the closing body and the main body and by at least one flexible nozzle diaphragm providing sealing continuity between the main body and the nozzle body.

Additionally, the flexible closing diaphragm is supported by a bearing surface when liquid flows inside the injection chamber. The injection chamber is therefore properly isolated from the rest of the injection device, thereby ensuring a proper flow of liquid solely inside the injection chamber directly into the preform.

According to other features of the injection device according to the invention:

the injection device further comprises a rigid second support body, extending outside the injection chamber, said second support body being attached to the main body or forming a portion of the main body in the vicinity of the second end of the flexible nozzle diaphragm;

at least one of or each of said ends of a corresponding diaphragm includes or is made of elastomeric material and forms a closed loop received in an attachment housing of the corresponding cavity body to which said end of the diaphragm is attached, and wherein said attachment housing has a cross section comprising a hook shape for retaining said end and being sized to compress the elastomeric material and to be totally filled with said end to prevent liquid from entering into the annular attachment housing during the movement of the corresponding diaphragm.

The ends of the diaphragm(s) are completely encapsulated inside the attachment housing, thereby ensuring that liquid cannot get trapped in the injection chamber, which improves the hygiene of the injection device.

According to another feature of the injection device according to the invention, substantially the entire outer surface of the closing diaphragm is applied against the bearing surface when the closing body is in the opened position, such that the whole outer surface of the closing diaphragm is formed by the supported portion.

By having substantially the whole outer surface of the closing diaphragm applied against the bearing surface in the opened position of the closing element, meaning that the closing diaphragm has no unsupported free portion, it is ensured that the closing diaphragm is entirely supported during the injection of liquid, thereby making it able to sustain high pressures.

According to other features of the injection device according to the invention:

the injection device comprises an actuation system arranged to move the nozzle body relative to the preform seat and the closing body relative to the nozzle body to obtain the following configurations:

a retracted configuration wherein the nozzle body is in the retracted position and the closing body is in the closed position, a connected configuration wherein the nozzle body is in the active position and the closing body is in the closed position, and an active configuration wherein the nozzle body is in the active position and the closing body is in the opened position, and wherein the actuation system is further arranged to drive the injection device following an activation sequence including successively the retracted configuration, the connected configuration and the active configuration.

the outside area is formed by a free space outside the injection chamber such that the outer surface of the closing diaphragm or of the nozzle diaphragm is completely formed by the supported portion and by the free portion, said free portion facing said free space.

According to another feature of the injection device according to the invention, the outlet is applied in a liquid tight contact with the preform during the injection of liquid in the preform such that the outlet is in a liquid tight fluidic communication with the preform.

The invention also relates to an injection station for a forming and filling station for forming a preform into a container and filling said container using a pressurized liquid, said injection station comprising:

a mold defining a molding cavity having the shape of the container to be produced, said mold being arranged to receive a preform, and an injection device comprising:

a main housing comprising an inlet intended to be placed in fluidic communication with a pressurized liquid source, an outlet intended to be placed in fluidic communication with the preform placed in the mold and an injection chamber arranged to receive and contain the pressurized liquid between the inlet and the outlet, a closing body, movable relative to the outlet between a closed position and an opened position, a closing diaphragm attached at least to the closing body, the injection chamber being delimited at least by an inner surface of said closing diaphragm, said closing diaphragm having an outer surface extending outside the injection chamber and defining an outside area isolated from the injection chamber in a fluid tight manner, a bearing surface against which a supported portion of the outer surface of the closing diaphragm is applied, the bearing surface being defined by at least a part of the main housing and/or by at least a part of the closing body, the closing diaphragm further comprising a free portion forming with the supported portion the whole outer surface of the closing diaphragm, wherein the bearing surface is arranged such that the surface of the free portion decreases when the closing body moves from the closed position to the opened position.

The invention also relates to an injection method using an injection device as described above, comprising the following steps:

closing the outlet by moving the closing body to a closed position relative to the outlet, connecting the outlet in a liquid tight manner to a preform opening when the closing is completed, opening the outlet when the connecting is completed, said opening being made by moving the closing body to a opened position allowing the pressurized liquid to flow out of the injection chamber to the inside of the preform, reducing the free portion of at least the closing diaphragm during or after said opening by decreasing the surface of the free portion of said diaphragm.

As mentioned previously, when a liquid is flowing through the outlet, the mechanical support of the closing diaphragm is increased, thereby ensuring that the closing diaphragm can endure high pressures.

Advantageously, the closing of the closing body takes place when said connecting the outlet is completed.

The invention also relates to a forming and filling method for forming a preform into a container, comprising the injection method described above and comprising the following steps:

introducing a heated preform into a mold cavity, filling the injection chamber with pressurized liquid at a first pressure, prior to opening the outlet, and increasing the pressure of the liquid inside the injection chamber after said reducing the free portion, in order to expand the preform up to the shape of the mold cavity.

According to other features of the forming and filling method:

the pressure of the pressurized liquid is increased over 20 bars, preferably over bars;

the preform used is made of PET, and the pressure of the pressurized liquid is increased over 35 bars, connecting the outlet in a liquid tight manner to the preform opening comprises placing the outlet in a liquid tight contact with the preform opening in order to inject the pressurized liquid to the inside of the preform in a liquid tight manner.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

Figure 1:
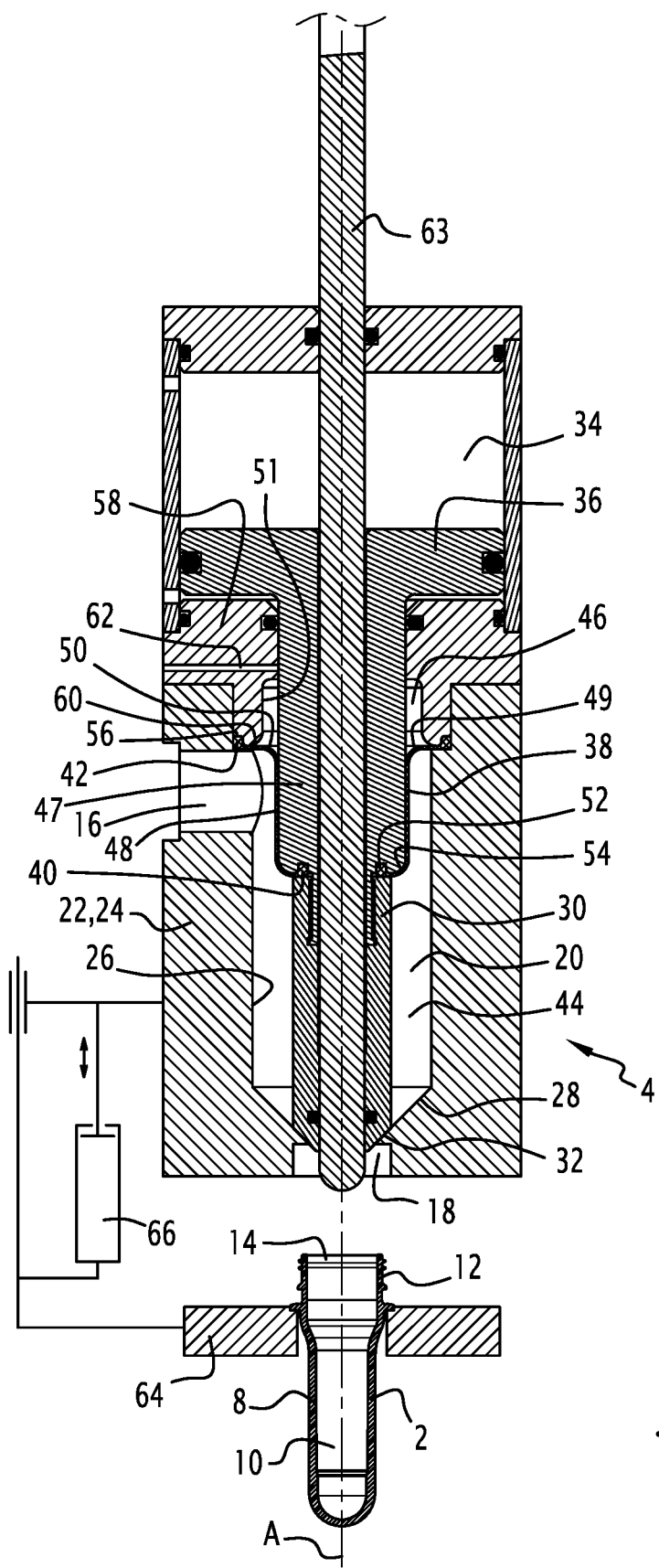
FIG. 1 is a cross section view of an injection device according to a first embodiment of the invention, the injection device being in a retracted configuration with the main body in an active position and the closing body in a closed position.

In the following description, the terms "upper" and "lower" are defined relative to axis A, which corresponds to the axis of the container to be produced and which extends substantially vertically when the container is placed on its bottom. The terms "upstream" and "downstream" are defined relative to the direction of the flow of liquid flowing from the inlet to the outlet of the injection device.

The invention relates to the technical field of forming containers, such as bottles, for example sterile or asepticized bottles containing water or carbonated water based drinks.

More specifically, the invention relates to an injection device used in a station for producing a container from a preform 2 using a station comprising an injection device 4 arranged to inject an incompressible liquid in the preform 2, which may be placed in a mold 6 (FIG. 7), the incompressible liquid being able to shape the preform 2 into the container and to fill the container, as will be described later. Such a method is known as hydro forming and uses a hydro forming machine, which is known per se and which will not be described in detail herein.

As known, the mold 6 defines a molding cavity having the shape of the container to be produced and arranged to receive the preform 2 when the incompressible liquid is injected inside said preform. Such a mold is known and will not be described in greater detail herein.

The preform 2 comprises a hollow body 8, defining an inner volume 10, and a neck 12 comprising an opening 14, through which the inner volume 10 is accessible. A preform may have a shape similar to that of a test tube being closed at lower end and having the neck 12 with the opening 14 at the upper end. The neck 12 already has the final shape of the neck 12 of the container 1 to be produced. The preform 2, shown, by way of non-limiting example in FIG. 1, has a cylindrical body 8 extending along an axis A which coincides with the axis of the neck 12. The preform may be made from any suitable plastic materials, such as polyesters, such as polyethylene terephthalate (PET), polyethylene naphthalate (PEN), polyethylene imine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), acrylonitrile butadiene styrene (ABS) or other polymers, such as polyvinyl chloride (PVC). The preforms 2 are generally produced according to an injection molding process and molded at a site different from the site where the machine for forming containers 1 is located.

Alternatively, the preform could include some metal, in particular the preform could be made of a metallic alloy, such as a steel or aluminum alloy. For example, the preform could be the major part of a can on which a lid is crimped. The liquid forming process according to the invention could be used to provide shape details on the can wall together with filling the can before crimping the lid.

The incompressible liquid injected in the preform by the injection device 4 is for example the liquid which is intended to fill the container 1, when the container 1 is used by an end user.

In reference to FIGS. 1 to 3, a first embodiment of the injection device 4 for injecting the incompressible liquid in the preform 2 will be described.

The injection device 4 comprises a main housing 22 comprising, or defining, an inlet 16, an outlet 18 and an inner chamber 20 extending between the inlet 16 and the outlet 18 and placing the inlet 16 in fluidic communication with the outlet 18.

According to the first embodiment, the inlet 16, the outlet 18 and the inner chamber 20 are defined by a main body 24, forming the whole main housing 22, made of a single rigid block or is made of rigid elementary bodies rigidly fixed together, meaning that the main body 24 forms a single unit. The main body 24 is for example formed of a hollow casing.

The inlet 16 is intended to be placed in fluidic communication with an incompressible liquid source (not shown), for example a water reservoir, via injection means (not shown) adapted for transferring the liquid from the liquid source to the inlet 16, and appropriate tubing extending between the inlet, the injection means and the liquid source. The injection means are for example formed by a pump, a piston or by other appropriate means allowing the liquid to be transferred to the inlet 16 at a chosen and controllable pressure.

The outlet 18 is adapted to be placed in liquid tight fluidic communication with the opening 14 formed by the neck 12 of the preform 2, and therefore with the inner volume 10 of the preform 2. By liquid tight fluidic communication, it is meant that when the outlet 18 is in fluidic communication with the inner volume of the preform 2, the liquid flows only in the inner volume 10 of the preform 2 and not outside the preform 2. More particularly, as shown in FIGS. 2, 3, 5, 6 and 7, the outlet 18 is arranged to be placed in a liquid tight contact with the preform 2 such that when the main body 24 is in an active position, as will be described subsequently, the outlet 18 is applied against the neck 12 of the preform 2 to provide a liquid tight fluidic communication between the outlet 18 and the opening 14 formed by the neck 12 of the preform 2. As shown in FIG. 7, sealing means can be provided around the outlet to seal the contact between the outlet and the neck 12 of the preform.

The inlet 16 and the outlet 18 both open in the inner chamber 20, which has for example a substantially cylindrical shape extending around an axis A, aligned with the axis of the preform 2, when said preform 2 is in fluidic communication with the outlet 18.

The inner chamber 20 comprises a substantially regular cylindrical portion 26, extending according to axis A and may have a constant diameter. The injection chamber 20 further comprises a truncated cone or pyramidal portion 28 extending between the regular cylindrical portion 26 and the outlet 18, the diameter of the inner chamber 20 reducing progressively from the diameter of the cylindrical portion 26 to the diameter of the outlet 18 in the conical portion 28. Axis A is preferably vertical.

A closing body 30 extends in the inner chamber 20. According to the first embodiment, the closing body 30 is a hollow control rod extending along axis A and comprising, at its lower end, a sealing annular surface 32. The sealing annular surface 32 has a shape which is complementary to the shape of part of the conical portion 28, such that, when the sealing annular surface 32 is applied against the wall of the conical portion 28, the sealing annular surface 32 closes hermetically the inner chamber 20 and prevents liquid from flowing through the outlet 18. The closing body 30 is movable inside the inner chamber 20 along axis A between a closed position, shown in FIGS. 1 and 2, wherein the sealing annular surface 32 is applied against the wall of the conical portion 28, and an opened position, shown in FIG. 3, wherein the sealing annular surface 32 is spaced from the wall of the conical portion 28, such that the outlet 18 is in fluidic communication with the inlet 16 via the inner chamber 20.

An upper compartment 34 is arranged above the inner chamber 20 to receive actuation means for moving the closing body 30. The upper compartment 34 is attached to the main body 24 in a rigid manner, forming a single unit with said main body. The actuation means are for example pneumatic actuation means and for example comprise a piston 36, attached to the closing body and hermetically separating the upper compartment 34 into an upper part and into a lower part, each able to be filled with air. For moving the closing body 30 between its opened position and its closed position, air is injected in the upper part of the upper compartment 34 in order to increase the pressure in said upper part and to move the piston 36 such that the volume of the upper part increases, while to volume of the lower part decreases. Conversely, for moving the closing body 30 between its closed position and its opened position, air is injected in the lower part of the upper compartment 34 in order to increase the pressure in said lower part and to move the piston 36 such that the volume of the lower part increases, while to volume of the upper part decreases. The upper compartment 34 is isolated from the inner chamber 20 in a fluid tight manner by appropriate sealing elements.

One of the sealing elements preventing liquid to flow from the inlet 16 to the upper compartment 34 along the closing body 30, which extends from the upper compartment 34 to the inner chamber 20, is a closing diaphragm 38, extending in the inner chamber 20.

The closing diaphragm 38 is a sleeve shaped flexible membrane, for example made of elastomeric material, arranged to maintain a liquid tightness between the closing body 30 and the main body 24, all along the relative movement between the closing body 30 and the main body 24. To this end, a first end 40 of the closing diaphragm 38 is attached to the closing body 30 and a second end 42 of the closing diaphragm 38 is attached to the main body 24. More particularly, the first end 40 of the closing diaphragm 38 extends all around the main body 24 and the second end 42 also extends all around the main body.

Between the first end 40 and the second end 42, the closing diaphragm 38 extends around the closing body 30, as a sleeve, and in the inner chamber 20. The closing diaphragm 38 therefore separates the inner chamber 20 into an injection chamber 44 and into an outside area 46, which are isolated in a fluid tight manner from each other.

The injection chamber 44 is further delimited by the wall of the main body 24 and by the wall of the closing body 30, such that the injection chamber 44 is only opened at the inlet 16 and at the outlet 18. Since the closing body 30 and the main body 24 delimit the injection chamber 44, they can be referred to as cavity bodies forming part of the wall of the injection chamber 44 with the closing diaphragm 38.

The outside area 46 can be designated as a dry area because it is isolated from the inlet 16, the injection chamber 44 and the outlet 18, and is therefore designed not to receive any liquid.

The closing diaphragm 38 comprises an inner surface 48, which faces the injection chamber 44 and an outer surface 50, which faces the outside area 46 and the wall of the closing body 30.

The outer surface 50 of the closing diaphragm comprises a supported portion defined as the part of the outer surface 50 which is applied against the wall of one of the rigid bodies of the injection device 4 delimiting the inner chamber 20, outside the injection chamber 44, for example an outside portion 47 of the closing element 30 and/or the wall of the inner chamber 20. As will be described later, the supported portion of the outer surface 50 is variable depending on the position of the closing body 30 relative to the inner chamber 20. The parts of the walls against which the supported portion is applied are called the bearing surface.

The outer surface 50 of the closing diaphragm 38 can also comprise, at least when the closing body 30 is not in the opened position, a free portion 49 defined by the part of the outer surface 50, which is unsupported, meaning which is not applied against a rigid wall. It is understood that the supported portion and the free portion 49 form together the whole outer surface 50 of the closing diaphragm 38.

The first end 40 of the closing diaphragm 38 is arranged in an attachment housing 52 formed in the closing body 30. The attachment housing 52 has an annular shape extending all around the closing body 30 and has a cross section comprising a hook shape arranged to retain the first end 40 of the closing diaphragm 38. The first end 40 of the closing diaphragm 38, forming a closed loop, is arranged such as to intimately mate with the attachment housing 52 and to completely fill the attachment housing 52. The first end 40 is furthermore sized to be compressed by the wall of the attachment housing 52 such that liquid cannot penetrate inside the attachment housing 52. Consequently, liquid cannot be trapped inside the attachment housing 52, which avoids any risks of contamination inside the injection chamber 44. The attachment housing 52 is for example formed by the assembly of two parts rigidly fixed to each other and forming together the closing body 30. The outside portion 47 of the closing body 30 and the inner portion of the closing body 30 can be separated from each other during maintenance of the injection device, for example for replacing the closing diaphragm 38. The wall of the outside portion 47 of the closing body 30 has a rounded surface 54 extending beside the attachment housing 52 on which the part of the closing diaphragm 38 proximate its first end is applied, thereby providing a smooth contact between the wall of the closing body 30 and the closing diaphragm 38 by avoiding that the closing diaphragm 38 is applied against any sharp edges. Consequently, the wall of the closing body 30 cannot damage the closing diaphragm 38.

Likewise, the second end 42 of the closing diaphragm 38 is arranged in an attachment housing 56 formed in the wall of the inner chamber 20. The attachment housing 56 has an annular shape extending all around the inner chamber 20 and has a cross section comprising a hook shape arranged to retain the second end 42 of the closing diaphragm 38. The second end 42 of the closing diaphragm 38, forming a closed loop, is arranged such as to intimately mate with the attachment housing 56 and to completely fill the attachment housing 56. The second end 42 is furthermore sized to be compressed by the wall of the attachment housing 56 such that liquid cannot penetrate inside the attachment housing 56. Consequently, liquid cannot be trapped inside the attachment housing 56, which avoids any risks of contamination inside the injection chamber 44. The attachment housing 56 is for example formed by the assembly of the main body 24 with a first rigid support body 58 extending outside the injection chamber 44 and defining a part of the wall of the outside area 46. The first rigid support body 58 can be separated from the main body 24 during maintenance of the injection device, for example for replacing the closing diaphragm 38. The wall of the first rigid support body 58 has a rounded surface 60 extending beside the attachment housing 56 on which the part of the closing diaphragm 38 proximate its second end is applied, thereby providing a smooth contact between the wall of the first rigid support body 58 and the closing diaphragm 38 by avoiding that the closing diaphragm 38 is applied against any sharp edges. Consequently, the wall of the first rigid support body 58 cannot damage the closing diaphragm 38.

The outside area 46 is delimited by a curved wall portion 51 of the first rigid support body 58 and by the wall of the outside portion 47 of the closing body 30. The wall of the outside area 46 has a U shape in cross section and has a concavity which is turned towards the injection chamber 44. The wall of the outside area 46 facing the outer surface 50 of the closing diaphragm 38 has no sharp edges.

The first rigid support body 58 further comprises an air vent 62 in fluidic communication with the outside area 46. The air vent 62 opens at one end in the bottom of the U shape of the outside area 46 and at the other end on the exterior of the injection device 4.

The injection device 4 may further comprise a stretch rod 63 extending inside the hollow control rod forming the closing body 30, passing through the outlet 18 and extending in the preform 2 to assist in the deformation of the preform 2 into a container, as known per se. The stretch rod 63 is movable in translation along axis A in the hollow control rod. The functioning of the stretching rod 22 is known and will not be described in detail herein.

The injection device 4 further comprises a preform seat 64 arranged for receiving the preform 2. The preform seat 64 and the main body 24 are movable relative to each other via an actuator 66 between an active position (FIGS. 2 and 3), wherein the outlet 18 is placed in fluidic communication with the preform 2, i.e. wherein the outlet 18 is applied in a liquid tight manner against the neck 12 of the preform 2, and a retracted position (FIG. 1), wherein the preform seat 64 is spaced from the outlet, thereby allowing introducing a preform in the preform seat 64. The preform seat 64 can be formed by part of the mold 6 having the shape of the container to be produced. The actuator 66 can be of any suitable kind, such as a pneumatic or hydraulic piston or a servo motor arranged to move the main chamber 24 or the preform seat 64 between the retracted position and the active position.

The functioning of the injection device 4 will now be described. First, the main body 24 and the preform seat 64 are in the retracted position and a preform 2 is placed in the preform seat 64 as shown in FIG. 1. The closing element 30 is in the closed position. The closing diaphragm 38 is then mostly applied against the wall of the closing body 30, meaning that the bearing surface is mainly formed by wall of the outside portion 47 of the closing body 30. Only the part proximate to the second end 42 of the closing diaphragm 38 is applied against a part of the wall of the first rigid support body 58. Furthermore, in this position, the closing diaphragm 38 also comprises the free portion 49 which is not applied against any wall and which extends between the first rigid support body 58 and the closing body 30 and closes the outside area 46. In this position, the supported portion of the closing diaphragm 38 therefore extends more on the closing body 30 than on the first rigid support body 58.

Figure 2:
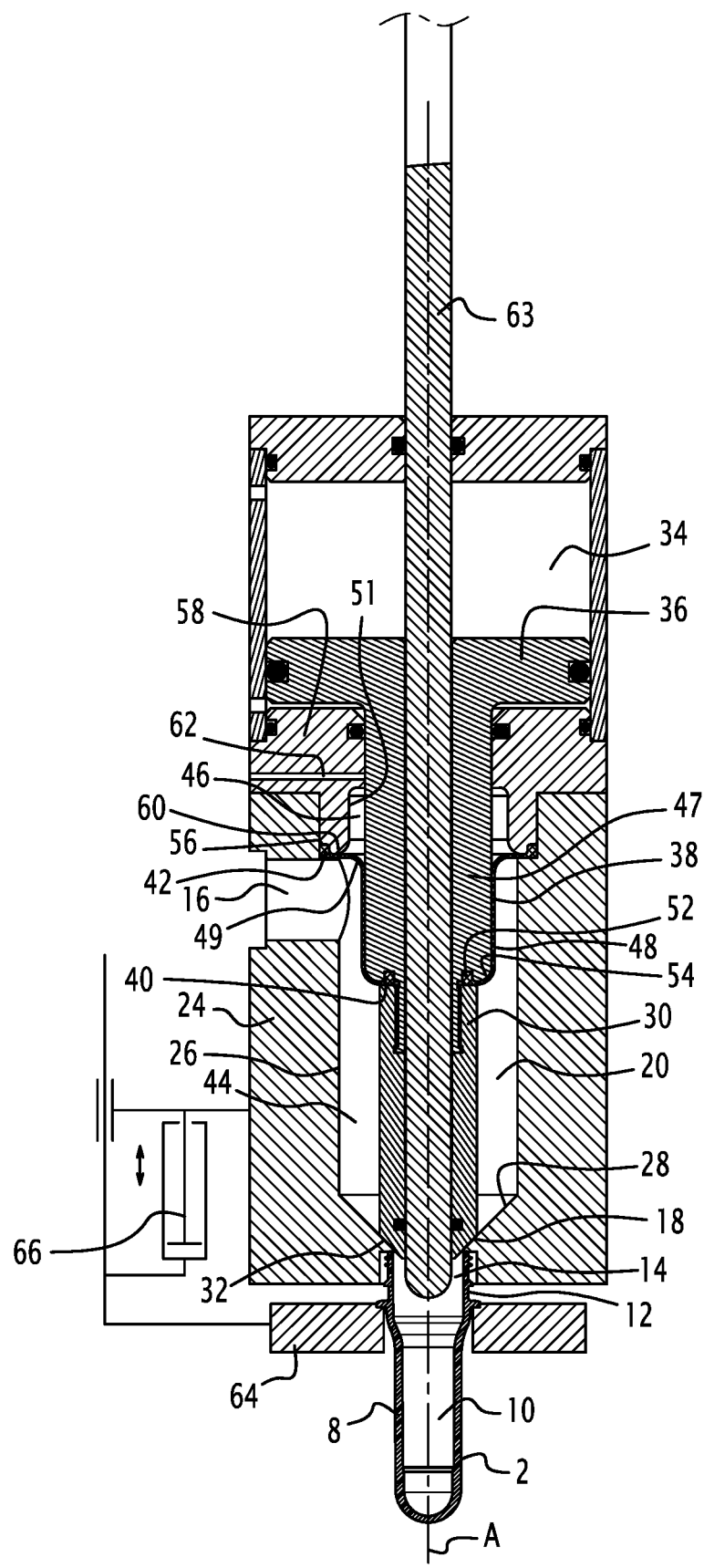
FIG. 2 is a cross section view of the injection device of FIG. 1 in a connected configuration with the main body in an active position and the closing body in the closed position.

The main body 24 and the preform seat 64 are then moved to the active position, shown in FIG. 2, while the closing body 30 remains in its closed position, to place the outlet 18 in fluidic communication with the preform 2. The injection chamber 44 is filled with liquid from the liquid source via the inlet 16 by actuating injection means known per se and not described here.

Figure 3:
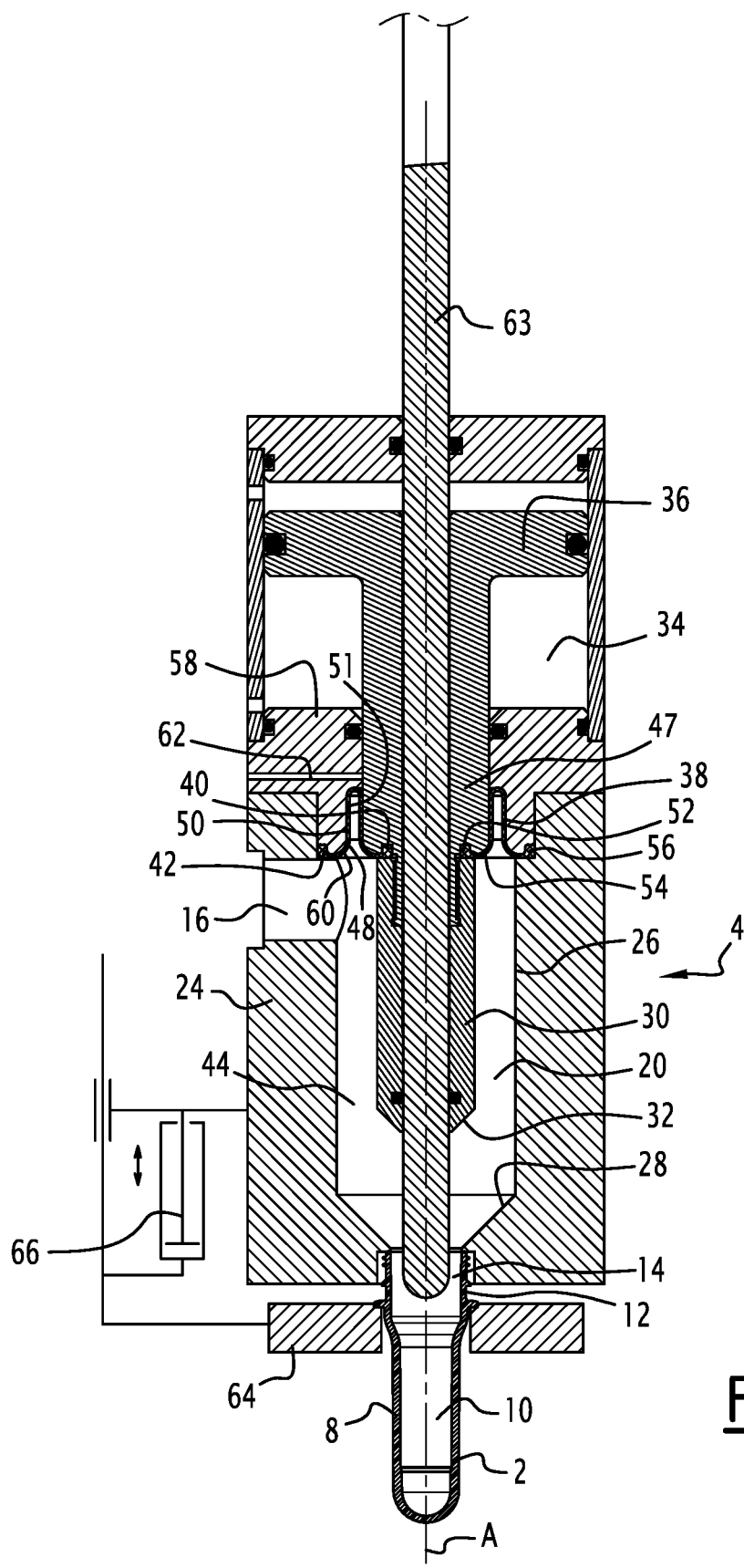
FIG. 3 is a cross section view of the injection device of FIG. 1 in an active configuration with the main body in the active position and the closing body in the opened position.

The closing body 30 is then moved in the opened position, as shown in FIG. 3, such that the liquid is injected in the inner volume 10 of the preform 2 via the outlet 18, causing the preform 2 to be deformed and to acquire the shape of the container to be produced. At the same time, the stretch rod 63 may be actuated in a known manner to assist in the axial deformation of the preform. As also known per se, the pressure of the liquid injected in the preform can be varied to create a pressure peak inside the preform 2 during a short time in order to finalize the shaping of the preform into a the container. A formed and filled container is then obtained.

During the movement of the closing body 30 between its closed position and its opened position, the closing diaphragm 38 moves inside the outside area 46 in a sliding movement causing the free portion 49 to be applied against the curved wall portion 51 of the first rigid support body 58, the free portion 49 gradually becoming a supported portion of the closing diaphragm, and causing a part of the outer surface 50 to disengage from the closing body 30 and to be applied against the wall of the first rigid support body 58. Such a movement of the closing diaphragm 38 is allowed by the shape of the closing diaphragm 38, which is arranged such that the closing diaphragm 38 is guided to be applied against the bearing surface formed by the first rigid support body 58 and by the closing body 30.

Consequently, the first rigid support body 58 is a receiving body. The surface of the free portion 49 of the outer surface of the closing diaphragm 28 decreases progressively while the volume of the outside area 46 decreases progressively during the movement of the closing body 30 towards the opened position until it becomes substantially null when the closing body 30 reaches the opened position. The air present in the outside area 46 is evacuated through the air vent 62 during this movement. In the opened position of the closing body 30, the supported portion of the outer surface 50 of the closing diaphragm is formed by substantially all the outer surface 50, meaning that the entire outer surface of the closing diaphragm 38 is applied against the bearing surface. The bearing surface has therefore increased between the closed position and the opened position of the closing body 30.

In the opened position of the closing body 30, the closing diaphragm 38 is therefore integrally applied against a rigid surface, which offers a great mechanical support to the closing diaphragm 38 and makes it able to withstand the pressure of the liquid flowing in the injection chamber, even during the pressure peak, where the liquid can reach a pressure over 20 bars. According to a particular embodiment, the pressure during the pressure peak can be over 35 bars, for example 50 bars. Consequently, there is no risk of tearing the closing diaphragm 38 during the injection of liquid in the preform 2 even though the closing diaphragm 38 is made of a fragile flexible membrane.

Once the injection is completed, the closing body 30 is moved back in its closed position and the main body 24 and the preform seat 64 are moved back in the retracted position. The formed and filled container can then be retrieved from the preform seat 64 and be replaced by a new preform to perform another cycle of forming and filling.

In the first embodiment, a single membrane is required for ensuring the fluid tightness of the injection chamber 44, which makes the number of fragile parts in the injection device small. But, in this embodiment, the whole main body 24 and the parts attached to it, which form a heavy structure, have to be displaced to be put in the active position. Such an embodiment has therefore an important mechanical constraint to be overcome.

Figure 4:
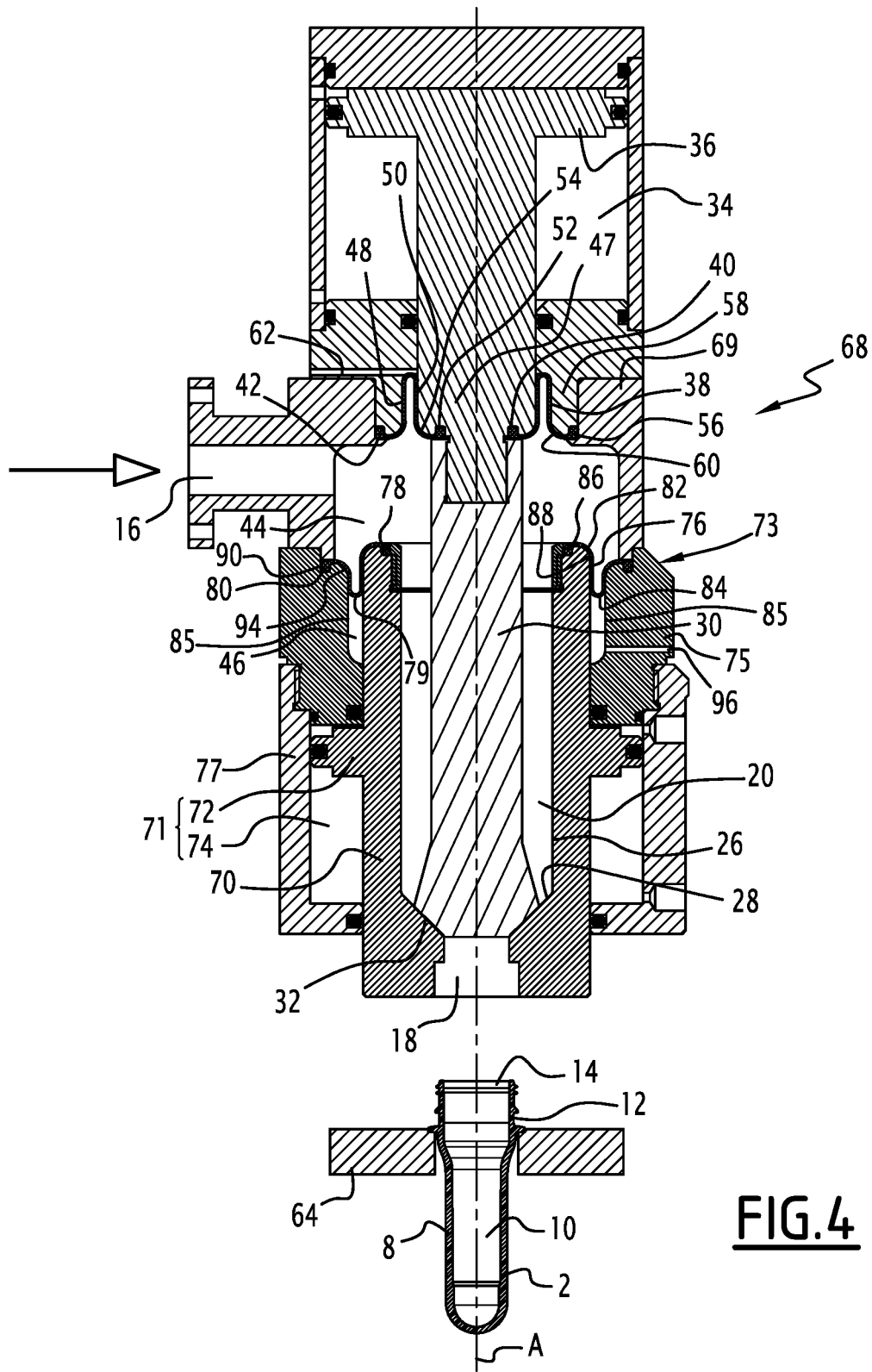
FIG. 4 is a cross section view of an injection device according to a second embodiment of the invention, the nozzle body being in a retracted position and the closing body being in the closed position.
Figure 5:
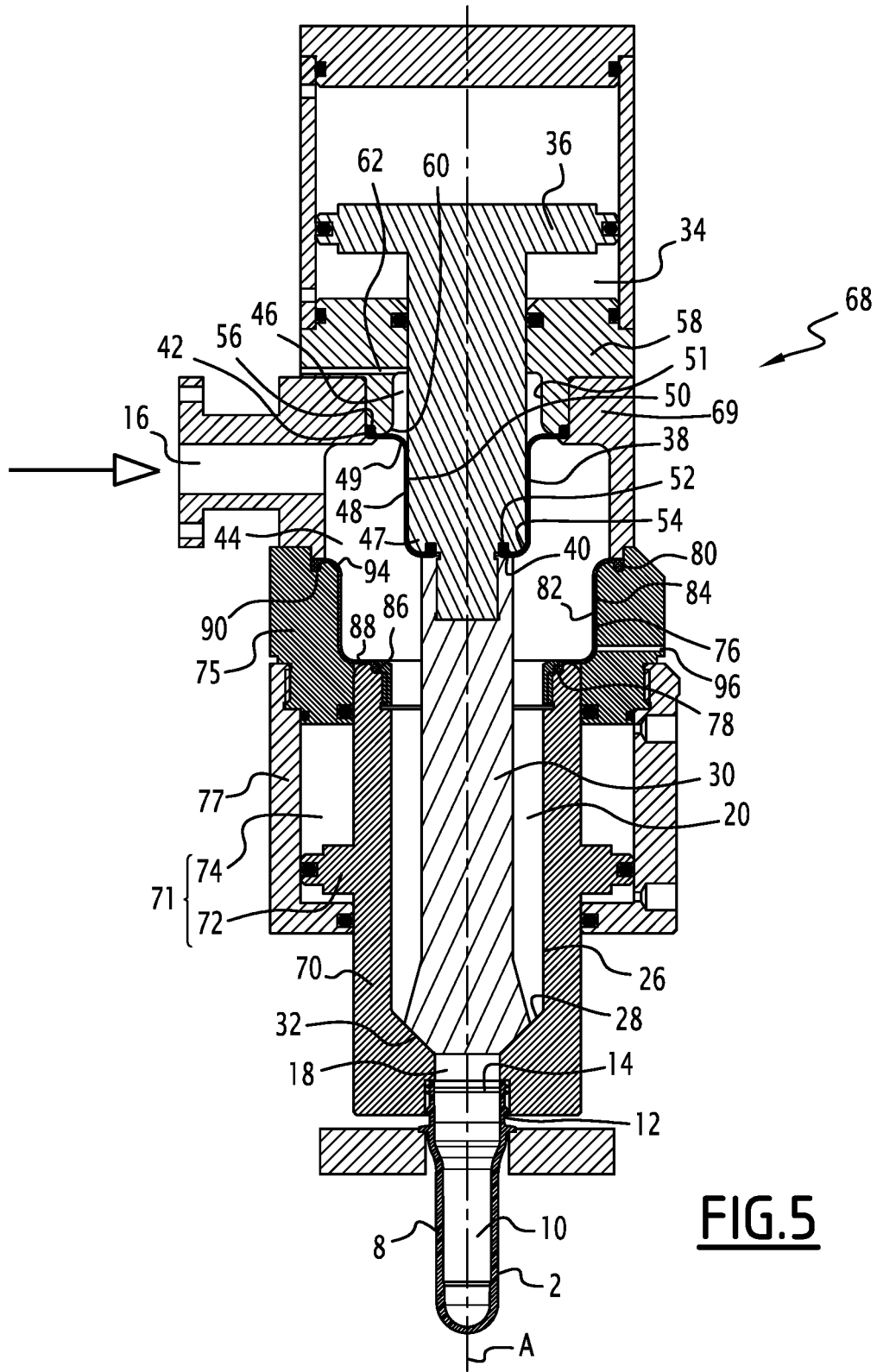
FIG. 5 is a cross section view of the injection device of FIG. 4, the nozzle body being in an active position and the closing body being in the closed position.
Figure 6:
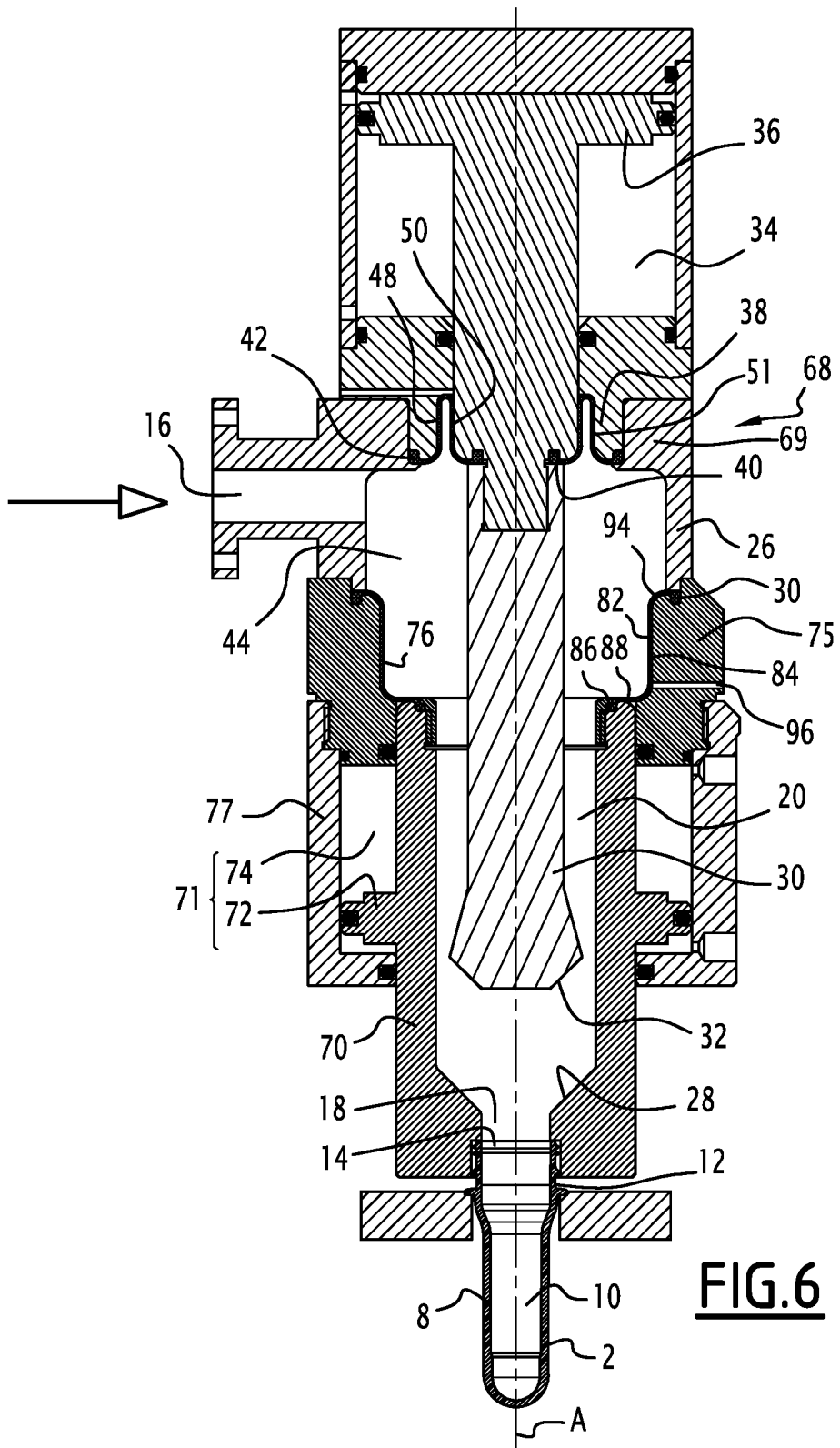
FIG. 6 is a cross section view of the injection device of FIG. 4, the nozzle body being in the active position and the closing body being in the opened position.
Figure 7:
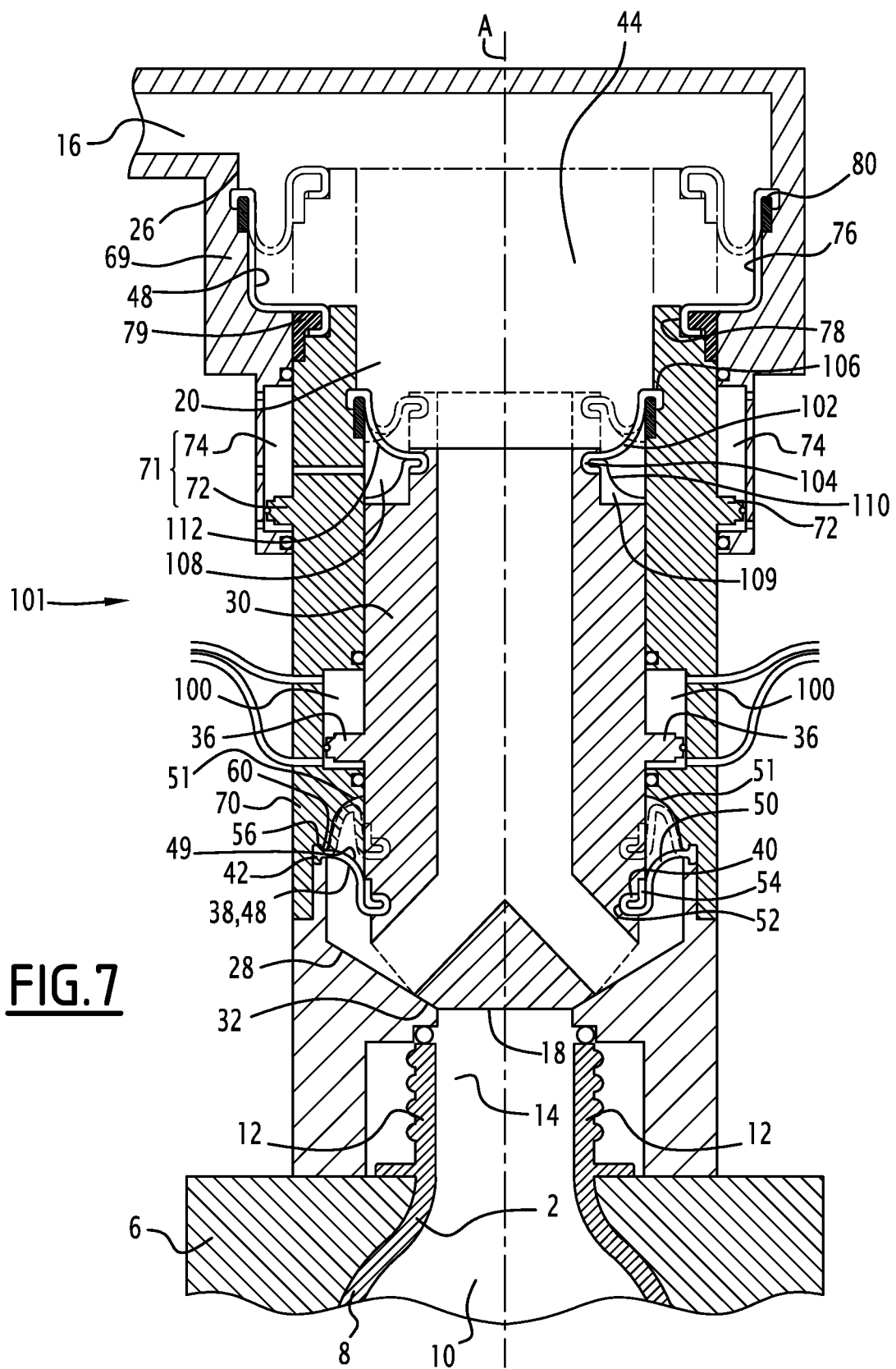
FIG. 7 is a cross section view of part of an injection device according to a third embodiment, the nozzle body being in an active position and the closing body being in the closed position.

A second embodiment of the injection device according to the invention, shown in FIGS. 4 to 6, is an injection device 68 wherein the inlet is formed in a main body 69 and the outlet 18 is formed in a nozzle body 70 movable relative to the main body 69 between the retracted position and the active position. Consequently, in this second embodiment, only the nozzle body 70 has to be moved between the retracted position and the active position, thereby reducing the mechanical constraint. This embodiment comprises a main housing 73 formed by the main body 69 and by the nozzle body 70, as well as by a second rigid support body 75 and a third body 77 described later. The cavity bodies delimiting the injection chamber 44 are the nozzle body 70, the main body 69 and the closing body 30.

The injection device 68 further comprises a nozzle actuator 71 to move the nozzle body 70. The nozzle actuator 71 is for example formed by an actuation piston 72 attached to and surrounding the nozzle body 70 and placed in an actuation chamber 74 extending around the nozzle body 70 attached to the main body 69 and defined for example by the assembly of the second rigid support body 75 and the third body 77. According to the embodiment shown in FIGS. 4 to 6, the actuation chamber 74 extends downstream of the inlet 16. The actuation piston 72 hermetically separates the actuation chamber 74 into an upper part and into a lower part, each able to be filled with air, or by any actuation fluid.

For moving the nozzle body 70 between its retracted position and its active position, air is injected in the upper part of the actuation chamber 74 in order to increase the pressure in said upper part and to move the actuation piston 72 such that the volume of the upper part increases, while to volume of the lower part decreases, thereby causing the nozzle body 70 to move downwards toward the preform seat 64. Conversely, for moving the nozzle body 70 between its active position and its retracted position, air is injected in the lower part of the actuation chamber 74 in order to increase the pressure in said lower part and to move the actuation piston 72 such that the volume of the lower part increases, while to volume of the upper part decreases, thereby causing the nozzle body to move upwards away from the preform seat 64. The actuation chamber 74 is isolated from the inner chamber 20 in a fluid tight manner by appropriate sealing elements.

Variants of the injection device 68 may use any type of nozzle actuator, like a magnetic and/or an electric actuator or a servo driven actuator.

One of the sealing elements preventing liquid to flow from the inlet 16 to the actuation chamber 74 along the nozzle body 70 is a nozzle diaphragm 76, extending in the inner chamber 20. The nozzle diaphragm 76, like the closing diaphragm 38, is a sleeve shaped flexible membrane, for example made of elastomeric material, arranged to maintain a liquid tightness between the nozzle body 70 and the main body 69, all along the relative movement between the nozzle body 70 and the main body 69. To this end, a first end 78 of the nozzle diaphragm 76 is attached to the nozzle body 70 and a second end 80 of the nozzle diaphragm 76 is attached to the main body 69. Between the first end 78 and the second end 80, the nozzle diaphragm 76 extends around the nozzle body 70 and in the inner chamber 20. Like the closing diaphragm 38, the nozzle diaphragm 76 therefore delimits the injection chamber 44 and defines an outside area 46, which is isolated in a fluid tight manner from the injection chamber 44.

The nozzle diaphragm 76 comprises an inner surface 82, which faces the injection chamber 44 and an outer surface 84, which faces the outside area 46 and the wall of the nozzle body 70.

The outer surface 84 of the nozzle diaphragm 76 comprises a supported portion defined as the part of the outer surface 84 which is applied against rigid walls of the injection device 68, i.e. the outside portion of the nozzle body 70 and/or the wall of the second rigid support body 75. The parts of the walls of the cavity bodies against which the supported portion is applied are called the bearing surface.

The outer surface 84 of the nozzle diaphragm can also comprise, at least when the nozzle body 70 is not in the active position, a free portion 79 defined by the part of the outer surface 84, which is unsupported, meaning which is not applied against the wall of one of the inner chamber 20. It is understood that the supported portion and the free portion 79 form together the whole outer surface 84 of the nozzle diaphragm 76.

The first end 78 of the nozzle diaphragm 76 is arranged in an attachment housing 86 formed in the nozzle body 70. The attachment housing 86 has an annular shape extending all around the nozzle body 70 and has a cross section comprising a hook shape arranged to retain the first end 78 of the nozzle diaphragm 76. The first end 78 of the nozzle diaphragm 76, forming a closed loop, is arranged such as to intimately mate with the attachment housing 86 and to completely fill the attachment housing 86. The first end 78 is furthermore sized to be compressed by the wall of the attachment housing 86 such that liquid cannot penetrate inside the attachment housing 86. Consequently, liquid cannot be trapped inside the attachment housing 86, which avoids any risks of contamination inside the injection chamber 44. The attachment housing 86 is for example formed by the assembly of two parts rigidly fixed to each other and forming together the nozzle body 70.

The parts can be separated from each other during maintenance of the injection device, for example for replacing the nozzle diaphragm 76. The wall of the nozzle body 70 has a rounded surface 88 extending beside the attachment housing 86 on which the part of the nozzle diaphragm 76 proximate its first end is applied, thereby providing a smooth contact between the wall of the nozzle body 70 and the nozzle diaphragm 76 by avoiding that the nozzle diaphragm 76 is applied against any sharp edges. Consequently, the wall of the nozzle body 70 cannot damage the nozzle diaphragm 76.

Likewise, the second end 80 of the nozzle diaphragm 76 is arranged in an attachment housing 90 formed in the wall of the inner chamber 20. The attachment housing 90 has an annular shape extending all around the inner chamber 20 and has a cross section comprising a hook shape arranged to retain the second end 80 of the nozzle diaphragm 76. The second end 80 of the nozzle diaphragm 76, forming a closed loop, is arranged such as to intimately mate with the attachment housing 90 and to completely fill the attachment housing 90. The second end 80 is furthermore sized to be compressed by the wall of the attachment housing 90 such that liquid cannot penetrate inside the attachment housing 90. Consequently, liquid cannot be trapped inside the attachment housing 90, which avoids any risks of contamination inside the injection chamber 44. The attachment housing 90 is for example formed by the assembly of the main body 69 with the second rigid support body 75 extending outside the injection chamber 44 and defining a part of the wall of the outside area 46. The second rigid support body 75 can be separated from the main body 69 during maintenance of the injection device, for example for replacing the nozzle diaphragm 76. The wall of the second rigid support body 75 has a rounded surface 94 extending beside the attachment housing 90 on which the part of the nozzle diaphragm 76 proximate its second end is applied, thereby providing a smooth contact between the wall of the second rigid support body 75 and the nozzle diaphragm 76 by avoiding that the nozzle diaphragm 76 is applied against any sharp edges. Consequently, the wall of the second rigid support body 75 cannot damage the nozzle diaphragm 76.

The outside area 46 is delimited by a curved wall portion 85 of the second rigid support body 75 and by an outside wall of the nozzle body 70 extending on the side of the outer surface 84 of the nozzle diaphragm 76. When the nozzle body 70 is in the retracted position, the wall of the outside area 46 has a U shape in cross section and has a concavity which is turned towards the injection chamber 44. Consequently, the wall of the outside area 46 facing the outer surface 84 of the nozzle diaphragm 76 has no sharp edges.

The second rigid support body 75 further comprises an air vent 96 in fluidic communication with the outside area 46. The air vent 96 opens at one end in the bottom of the U shape of the outside area 46 and at the other end on the exterior of the injection device.

The rest of the injection device 68 according to the second embodiment is substantially similar to the injection device according to the first embodiment. It should be noted that in the variant shown in FIGS. 4 to 6, the injection device does not comprise a stretch rod. However, such a stretch rod could be provided like the stretch rod 63 could be removed from the first embodiment.

The functioning of the injection device of the second embodiment will now be described. First, the injection device 68 is in a retracted configuration wherein the nozzle body 70 is in the retracted position and the closing body 30 is in the closed position, as shown in FIG. 4. In this configuration, the closing body 30 is in such a position that the closing diaphragm 38 is completely applied against the wall of the dry area 46 as when the closing body 30 is in the opened position. The nozzle diaphragm 76 is then mostly applied against the outside wall of the nozzle body 70, meaning that the supported surface is mainly formed by wall of the nozzle body 70. Only the part proximate to the second end 80 of the nozzle diaphragm 76 is applied against a part of the wall of the second rigid support body 75. Furthermore, in this position, the nozzle diaphragm 76 also comprises the free portion 79 which is not applied against any wall and which extends between the second rigid support body 75 and the nozzle body 70 and closes the outside area 46. In this position, the supported portion of the nozzle diaphragm therefore extends more on the closing body than on the second rigid support body 75.

The actuation system then moves the injection device to a connected configuration, wherein the nozzle body 70 is in the active position, i.e. wherein the outlet 18 is applied in a liquid tight contact against the neck 12 of the preform 2, and the closing body 30 is in the closed position. In this configuration, the closing body 30 has been lowered with the nozzle body 70 to remain in the closed position. The closing diaphragm 38 is than in the position described previously with respect of the closing body 30 in the closed position in the injection device of the first embodiment.

The lowering of the nozzle body 70 causes the nozzle diaphragm 76 to move inside the outside area 46 in a sliding movement causing the nozzle diaphragm 76 to be less applied on the nozzle body 70 and more on the second rigid support body 75. Consequently, like the closing diaphragm 38, the nozzle diaphragm 76 has a shape arranged such that the nozzle diaphragm 76 is guided to be applied against the bearing surface formed by the second rigid support body 75 and by the nozzle body 70. So the second rigid support body 75 is a receiving body 75. The movement of the nozzle body 70 towards its position in the active configuration of the injection device 68 causes the free portion 79 to be applied against the curved wall portion 85 of the second rigid support body 75, the free portion 79 gradually becoming a supported portion of the nozzle diaphragm 76, and causing a part of the outer surface 84 to disengage from the nozzle body 70 and to be applied against the wall of the second rigid support body 75.

Consequently, the surface of the free portion 79 of the outer surface of the nozzle diaphragm 76 decreases progressively while the volume of the outside area 46 decreases progressively during the movement of the nozzle body 70 towards the active position until it becomes substantially null when the nozzle body 70 reaches the active position. The air present in the outside area 46 is evacuated through the air vent 96 during this movement.

In the active position of the nozzle body 70, the supported portion of the outer surface 84 of the nozzle diaphragm is formed by substantially all the outer surface 84, meaning that the entire outer surface of the nozzle diaphragm 76 is applied against the bearing surface.

The bearing surface has therefore also increased between the retracted position and the active position of the nozzle body 70. In the active position of the nozzle body 70, the nozzle diaphragm 76 is therefore integrally applied against a rigid surface, which offers a great mechanical support to the nozzle diaphragm 76.

The actuation system then moves the injection device 68 in an active configuration wherein the nozzle body 70 is in the active position and the closing body 30 is in the opened position, as shown in FIG. 6. Liquid is injected in the inner volume 10 of the preform 2 via the outlet 18, causing the preform 2 to be deformed and to acquire the shape of the container to be produced. As known per se, the pressure of the liquid injected in the preform can be varied to create a pressure peak inside the preform 2 during a short time in order to finalize the shaping of the preform into a the container. A formed and filled container is then obtained.

During the movement of the closing body 30 between the closed position and the opened position, the closing diaphragm 38 moves to be applied against the wall of the outside area 46 as it has already been described with respect of the closing body 30 in the opened position in the injection device of the first embodiment. Consequently, during the injection of liquid in the preform 2, both the closing diaphragm 38 and the nozzle diaphragm 76 have a great mechanical support and substantially do not comprise any free portion susceptible to be damaged under the pressure of the liquid.

It should be noted that in the active position of the nozzle body 70, the attachment housing 86 retaining the first end 78 of the nozzle diaphragm 76 is placed in such a position that the liquid is able to flow towards the outlet 18 and not remain trapped between the nozzle body 70 and the second rigid support body 75, thereby avoiding any risks of contaminating the injection chamber 44 with stagnant liquid.

In the second embodiment, two fragile parts are needed, but the risks of damaging them is reduced by ensuring their mechanical support during the injection of liquid as described above. Furthermore, the nozzle body 70 is much easier to move than the whole bloc including the main body 69, the firs rigid support body 58, the second rigid support body 75 and the upper compartment 34? This makes the injection device according to the second embodiment easier to actuate.

According to a third embodiment shown in FIG. 7, an injection device 101 may include actuation means of the closing body 30 provided downstream of the inlet 16, by making the piston 36 extend around the closing body 30 in a second actuation chamber 100 extending below the actuation chamber 74 of the nozzle body 70. Such an embodiment reduces the stroke of the piston 36, which simply has to be able to move the closing body 30 between its closed position and its opened position and does not have to comprise a part of the stroke for moving the closing body 30 with the nozzle body 70, when said nozzle body 70 moves from its retracted position to its active position, in order to maintain the closing body 30 in its closed position.

However, in such an embodiment, a third diaphragm 102 is needed to ensure the fluid tightness between the closing body 30 and the nozzle body 70. The third diaphragm 102 is like the closing diaphragm 38 and the nozzle diaphragm 76. One end 104 of the third diaphragm 102 is attached to the closing body 30 while its other end 106 is attached to the nozzle body 70, and, like the closing diaphragm 38 and the nozzle diaphragm 76, the third diaphragm 102 separates an outside area 108 from the injection chamber 44.

Like for the closing diaphragm 38 and the nozzle diaphragm 76, the wall of the outside area 108 forms a bearing surface offering a great mechanical support to the third diaphragm when the closing body is in its opened position and liquid is flowing in the injection chamber 44.

In the third embodiment, the outside area 108 is delimited by the wall of the nozzle body 70 and by the wall of the closing body 30 extending at the upper end of the closing body 30. To this end, an outside portion 109 of the closing body 30 at his upper end is a receiving body comprising a curved portion 110 arranged to receive the third diaphragm 102 when the closing body 30 moves to the opened position, as will be described subsequently. The wall of the outside area 108 has a U shape in cross section and has a concavity which is turned towards the injection chamber 44. The functioning of the injection device of the third embodiment will now be described.

First, the injection device is in a retracted configuration wherein the nozzle body 70 is in the retracted position shown in dotted line in FIG. 7 and the closing body 30 is in the closed position, as shown in hard line in FIG. 7. In this configuration, the closing body 30 is in such a position that the closing diaphragm 38 comprises a free portion 49 as when the closing body 30 is in the closed position in the first embodiment described previously in reference to FIGS. 1 and 2. The nozzle diaphragm 76 also comprises an important free portion 79 since almost only the ends of the nozzle diaphragm 76 are supported by the main body 69 and by the nozzle body 70. Likewise, the third diaphragm 102 comprises an important free portion 112 and the supported portion of the third diaphragm 102 extends more on the nozzle body 70 than on the closing body 30.

The actuation system then moves the injection device to a connected configuration, wherein the nozzle body 70 is in the active position and the closing body 30 is in the closed position. In this configuration, only the nozzle actuator 71 has been actuated, since the closing body 30 moves with the nozzle body 70. In this configuration, the nozzle diaphragm 76 is completely supported as described previously in reference to FIGS. 5 and 6. The other flexible diaphragms, i.e. the closing diaphragm 38 and the third diaphragm 102 remain in the same position, i.e. almost unsupported.

The closing body 30 is then moved to the opened position, which causes the closing diaphragm 38 to be applied against the wall of the outside area 46 as it has already been described with respect of the closing body 30 in the opened position in the injection device of the first embodiment and of the second embodiment.

The movement of the closing body 30 to the opened position also causes the third diaphragm 102 to move inside the outside area 108 in a sliding movement causing the free portion 112 to be applied against the curved wall portion 110 of the closing body 30, the free portion 112 gradually becoming a supported portion of the third diaphragm 102.

Like the closing diaphragm 38, the shape of the third diaphragm 102 has a shape arranged such that the third diaphragm 102 is guided to be applied against the bearing surface formed by the closing body 30 and by the nozzle body 70. Consequently, the surface of the free portion 112 of the outer surface of the third diaphragm 102 decreases progressively while the volume of the outside area 108 decreases progressively during the movement of the closing body 30 towards the opened position until it becomes substantially null when the closing body 30 reaches the opened position. In the opened position of the closing body 30, the supported portion of the outer surface of the third diaphragm 102 is formed by substantially all the outer surface, meaning that the entire outer surface of the third diaphragm 102, or almost the entire outer surface is applied against the bearing surface. In the opened position of the closing body 30, the third diaphragm 102 is therefore integrally applied against a rigid surface, which offers a great mechanical support to the third diaphragm 102.

During the movement of the closing body 30 to the opened position, the bearing surface progressively receiving the outer surface of the third diaphragm 102 is formed by the curved part 110 of the closing body 110. Liquid is injected in the inner volume 10 of the preform 2 via the outlet 18, causing the preform 2 to be deformed and to acquire the shape of the container to be produced.

As known per se, the pressure of the liquid injected in the preform can be varied to create a pressure peak inside the preform 2 during a short time in order to finalize the shaping of the preform into a the container. A formed and filled container is then obtained.

Consequently, during the injection of liquid in the preform 2, all the flexible diaphragms, i.e. the closing diaphragm 38, the nozzle diaphragm 76 and the third diaphragm 102, have a great mechanical support and substantially do not comprise any free portion susceptible to be damaged under the pressure of the liquid.

The invention claimed is:

1. An injection device for a forming and filling station for forming a preform into a container and filling the container using a pressurized liquid, the injection device comprising:
    a main housing comprising an inlet configured to be placed in fluidic communication with a pressurized liquid source, an outlet configured to be placed in fluidic communication with the preform and an injection chamber arranged to receive and contain the pressurized liquid and place the inlet in fluid communication with the outlet,
    a closing body, movable relative to the outlet between a closed position and an opened position, in the closed position the closing body forming an annular seal about the outlet,
    a closing diaphragm attached at least to the closing body, the injection chamber being delimited in part by an inner surface of the closing diaphragm, the closing diaphragm having an outer surface located outside the injection chamber and defining an outside area isolated from the injection chamber in a fluid tight manner,
    a bearing surface against which a supported portion of the outer surface of the closing diaphragm is applied, the bearing surface being defined by a part of the main housing and a part of the closing body,
    the closing diaphragm further comprising a free portion forming with the supported portion the whole outer surface of the closing diaphragm,
    wherein the bearing surface is arranged such that the free portion decreases when the closing body moves from the closed position to the opened position.

2. The injection device according to claim 1, comprising a plurality of cavity bodies including at least one pair of cavity bodies movable with respect to each other, wherein each pair of cavity bodies are associated with each other by a flexible diaphragm maintaining a liquid tightness between the pair of cavity bodies, all along the relative movement between the pair of cavity bodies, and wherein the injection chamber is totally delimited between the inlet and the outlet by a rigid surface of each pair cavity bodies and by each of the at least one flexible diaphragm associating with each pair of cavity bodies.

3. The injection device according to claim 2, wherein one of the cavity bodies is the closing body, the main housing including at least one other cavity body and one of said at least one flexible diaphragm is the closing diaphragm, the injection device having an active configuration wherein simultaneously the closing body is in the open position with respect to the outlet and the main housing is arranged such that the outlet is placed in a fluidic communication with the preform.

4. The injection device according to claim 2, wherein each of or at least one of the flexible diaphragms is a supported diaphragm having one end attached to one of the pair of cavity bodies and another end attached to the other of the pair of cavity bodies, and wherein the supported diaphragm is further associated with at least one rigid support body located outside of the injection chamber and against which a supported portion of an outer surface of the supported diaphragm is applied, the rigid support body being attached to or forming an outside portion of one of the associated cavity bodies.

5. The injection device according to claim 3, wherein at least one rigid support body associated with the supported diaphragm is a receiving body in which relative movement between the cavity bodies associated with the supported diaphragm towards the active configuration of the injection device increases the surface of the supported portion of the supported diaphragm applied against said receiving body, wherein the receiving body comprises a curved portion against which a free portion of the supported diaphragm is progressively applied during the relative movement.

6. The injection device according to claim 1, further comprising a preform seat arranged for receiving the preform, and a nozzle actuator arranged to move the outlet with respect to the preform seat between an active position, wherein the outlet is in fluidic communication with the preform, and a retracted position allowing introducing a preform in the preform seat.

7. The injection device according to claim 2, wherein one of the cavity bodies is a main body defining the inlet of the injection device and another cavity body is a nozzle body defining the outlet, the nozzle actuator being arranged to move the nozzle body relative to the main body between an active position and a retracted position.

8. The injection device according to claim 3, wherein the closing diaphragm has a first end attached to the closing body and a second end attached to the main body.

9. The injection device according to claim 7, wherein the nozzle actuator includes a first actuation chamber provided in the housing, and a nozzle piston member sliding in the first actuation chamber.

10. The injection device according to claim 7, comprising a nozzle diaphragm in addition to the closing diaphragm, the nozzle diaphragm having a first end attached to the nozzle body and a second end attached to the main body in order to provide a sealing continuity between the nozzle body and the main body all along relative movement between the nozzle body and the main body.

11. The injection device according to claim 10, further comprising a rigid second support body, extending outside the injection chamber, said second support body being attached to the main body or forming a portion of the main body in the vicinity of the second end of the nozzle diaphragm.

12. The injection device according to claim 8, wherein at least one of or each of end of a corresponding diaphragm includes or is made of elastomeric material and forms a closed loop received in an attachment housing of the corresponding cavity body to which the end of the diaphragm is attached, and wherein the attachment housing has a cross section comprising a hook shape for retaining the end of the corresponding diaphragm and being sized to compress the elastomeric material and to be totally filled with the end of the corresponding diaphragm to prevent liquid from entering into the annular attachment housing during the movement of the corresponding diaphragm.

13. The injection device according to claim 1, wherein the entire outer surface of the closing diaphragm is applied against the bearing surface when the closing body is in the opened position, such that the whole outer surface of the closing diaphragm is formed by the supported portion.

14. The injection device according to claim 1, wherein the outlet is in a liquid tight contact with the preform during the injection of liquid into the preform.

15. An injection method using an injection device according to claim 1, comprising the following steps:
closing the outlet by moving the closing body to a closed position relative to the outlet,
connecting the outlet in a liquid tight manner to a preform opening when the closing step is completed,
opening the outlet when the connecting step is completed, the opening step being made by moving the closing body to a opened position allowing the pressurized liquid to flow out of the injection chamber and into the inside of the preform,
reducing the free portion of at least the closing diaphragm during or after the opening step by decreasing the surface of the free portion of said diaphragm.

16. The injection device according to claim 1, wherein the closing body extends on opposing sides of the diaphragm.

17. An injection station for a forming and filling station for forming a preform into a container and filling the container using a pressurized liquid, the injection station comprising:
a mold defining a molding cavity in a shape of the container to be produced, the mold being arranged to receive a preform, and
an injection device comprising:
a main housing comprising an inlet configured to be placed in fluidic communication with a pressurized liquid source, an outlet configured to be placed in fluidic communication with the preform placed in the mold and an injection chamber configured to receive and communicated the pressurized liquid between the inlet and the outlet,
a closing body, movable relative to the outlet between a closed position and an opened position, in the closed position the closing body forming an annular seal about the outlet,
a closing diaphragm attached at least to the closing body, the injection chamber being delimited at least by an inner surface of the closing diaphragm, the closing diaphragm having an outer surface extending outside the injection chamber and defining an outside area isolated from the injection chamber in a fluid tight manner,
a bearing surface against which a supported portion of the outer surface of the closing diaphragm is applied, the bearing surface being defined by a part of the main housing and a part of the closing body,
the closing diaphragm further comprising a free portion forming with the supported portion the whole outer surface of the closing diaphragm,
wherein the bearing surface is arranged such that the surface of the free portion decreases when the closing body moves from the closed position to the opened position.

18. The injection method according to claim 15, further comprising:
introducing a heated preform into a mold cavity,
filling the injection chamber with pressurized liquid at a first pressure, prior to opening the outlet, and
increasing the pressure of the liquid inside the injection chamber after the reducing of the free portion, thereby expanding the preform into the shape of the mold cavity.

19. The injection method according to claim 15, wherein the connecting of the outlet in a liquid tight manner to the preform opening comprises placing the outlet in a liquid tight contact with the preform opening in order to inject the pressurized liquid to the inside of the preform in a liquid tight manner.

* * * * *